July 16, 1957 H. RHEIN ET AL 2,799,183
FREE WHEELING BICYCLE HUB
Filed Sept. 21, 1956 2 Sheets-Sheet 1

INVENTORS:
HANS RHEIN
LUDWIG BRENDEL
BY
Richardson, David and Nardon
Att'ys.

July 16, 1957
H. RHEIN ET AL
2,799,183
FREE WHEELING BICYCLE HUB
Filed Sept. 21, 1956
2 Sheets-Sheet 2
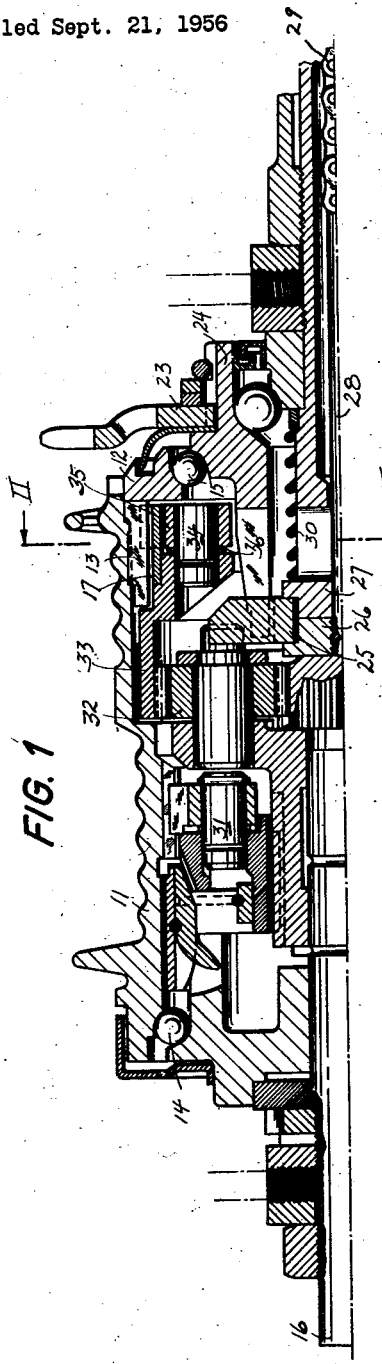
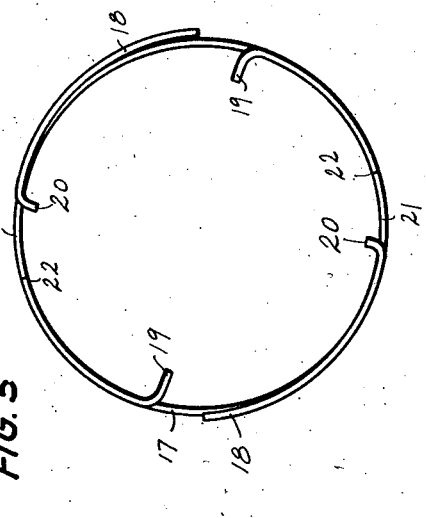
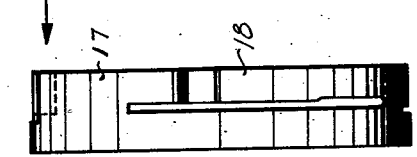
INVENTORS:
HANS RHEIN
LUDWIG BRENDEL
BY
Richardson, David and Nordon
ATTYS.

United States Patent Office 2,799,183
Patented July 16, 1957

2,799,183
FREE WHEELING BICYCLE HUB

Hans Rhein and Ludwig Brendel, Schweinfurt (Main), Germany, assignors to Firma Fichtel & Sachs A. G., Schweinfurt (Main), Germany Application September 21, 1956, Serial No. 611,310

Claims priority, application Germany November 24, 1955

5 Claims. (Cl. 74—750)

The present invention relates to a novel bicycle hub provided with a free wheeling mechanism. More particularly, it relates to a novel friction socket controlling the free wheeling mechanism of a bicycle hub including pawl actuated means for rotating the hub socket during gear driving of the bicycle.

Our experiments in the field of bicycle hubs have led to construction of bicycle hubs including free wheeling and gear shifting mechanisms either with or without a brake actuated by back pedalling. The forward gear drive has been effected by pawls the movements of which are controlled by a friction or control ring. These pawls may be guided laterally by pins engaging the control ring and leaf springs have been riveted to the control ring so as to be effective in axial direction, these leaf springs generating the necessary friction.

In an alternate construction the control ring may be arranged adjacent the teeth of a ratchet gear and the pawls are correspondingly widened so that they engage curved portions of the control disk. During free wheeling, the pawls of the driving ratchet are released so that gear engagement does not take place.

With hubs of this type where a back pedalling brake is provided, it has been found that upon occasion the act of braking causes the driving ratchet gear to become engaged so that the hub is locked. By providing a friction or control ring the motion of the pawls may be retarded so that the back pedalling brake releases before the pawls can engage the teeth of the ratchet gear. Furthermore, an actuation of the brake is prevented by the driving mechanism owing to the sliding in backward direction. Thus by providing the friction or control ring, not only the noise of the pawls is eliminated but simultaneously a locking of the hub in braked condition and the actuation of the brake at a backward shift is prevented.

These earlier constructions require complicated component parts or they require an elongated hub casing and their cost is accordingly increased.

It is accordingly an object of the present invention to provide a simplified control mechanism for the casing of a bicycle hub provided with a pawl operated driving gear arrangement.

A further object of the invention is to provide a quietly running pawl operated driving ratchet gear for a bicycle hub casing provided with free wheeling.

These and other objects and advantages are realized in accordance with the present invention wherein the hub casing is driven through positive gear engagement by means of a pawl actuated member. The pawls are controlled by a friction socket capable of sliding within the hub casing, the socket being provided with recesses for the passage therethrough of said pawls, with projections for limiting rotation of the socket, and with slide springs resting against an annular member connected with the hub casing.

In a preferred embodiment, the friction socket is formed from a band or tube of material such as metal with the component parts such as the recesses, the projections and the slide springs formed therein by a punching operation. The friction socket thus comprises a single integral element with several component parts.

A preferred embodiment of the invention will now be described with reference to the accompanying drawings, wherein:

Fig. 1 is an axial section through half of a bicycle hub in accordance with the present invention, taken along line I—I of Fig. 2;

Fig. 4 is a side elevation of the novel friction socket embodied in the hub of Figs. 1 to 3; and Fig. 5 is a front elevation of the friction socket as seen from the right hand side of Fig. 4 in the direction of the arrow.

Figure 2:
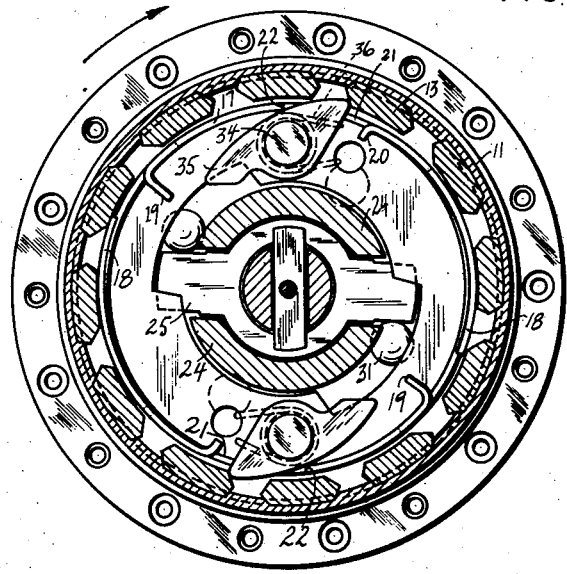
Fig. 2 is a vertical transverse section taken through the hub of Fig. 1 along line II—II with both halves shown.

Referring now more particularly to the drawing, in Fig. 1 there is shown a bicycle hub casing 11 to which there is secured at the right hand end an annular member 12 provided with cam-like projection 13. The casing 11 and member 12 are supported by ball bearings 14, 15 for rotation about axle 16. A friction socket 17 slides on the inner surface of member 12 and, as shown in Figs. 4 and 5, includes outwardly arched leaf spring portions 18, alternated inwardly directed projections 19 and 20, and recesses 21 defined between projections 20 and the edges 22 of the next segment of socket 17.

A sprocket wheel 23 is adapted to be driven by the pedals of the bicycle (not shown) and in turn drives an impeller 24 extending into the interior of casing 11. The impeller 24 upon rotation in turn rotates engaging member 25 which is seated in a recess defined by blocks 26, 27 which are connected with a gear shift rod 28 in turn connected to a chain 29 extending to a gear shift lever (not shown) adjacent the bicycle handlebar. A spring 30 urges blocks 26, 27 to the left so that it is in the path of carrier 31 of the sun- and planet-gear and thereby causes carrier 31 to be rotated. This produces rotation of planet gear 32 and external orbit gear 33 which is connected with pins 34.

Pawls 35 are pivotally mounted about pins 34 and are urged outwardly by springs 36 so that they extend through recesses 21 of socket 17 and abut against projections 13 causing the latter to rotate together with the casing 11, as shown in Fig. 2.

When it is desired to move into free wheeling, the driver stops pedalling which terminates rotation of wheel 23 and of all associated elements through pins 34 and pawls 35. Casing 11 and annular member 12 with its projections 13 continue to rotate and the frictional force of springs 18 causes socket 17 to be carried along slightly by projections 13. Edges 22 of the socket 17 thereby act upon pawls 35 and cause them to pivot against the action of springs 36 until the pawls are disengaged from the projections 18. It will be noted that rotation of the friction socket 17 is limited by projections 19 abutting against the pawls 35, and the elements will be in the positions shown in Fig. 3. Because pawls 35 are disengaged from projections 18 the casing 11 can rotate freely while the elements within the casing are stationary. As a result, there is silent operation.

Figure 3:
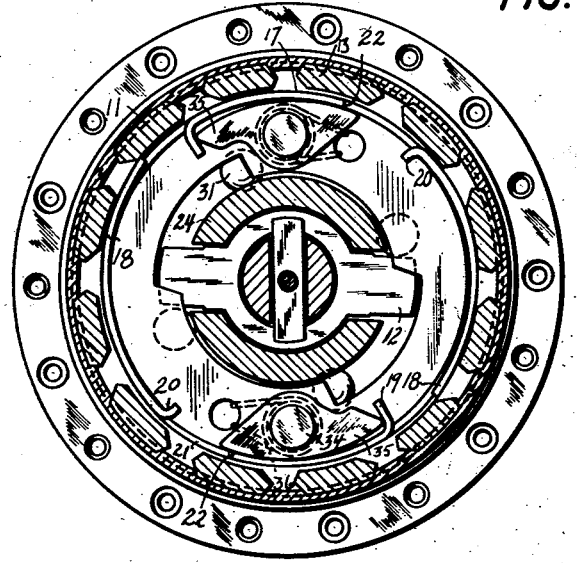
Fig. 3 is a view similar to Fig. 2 but with the elements shown in the position they assume during free wheeling or braking.

When braking, the pins 34 revolve in counter-clockwise direction so that the pawls 35 assume the same relative position shown in Fig. 3, as during free wheeling.

Various changes and modifications may be made without departing from the spirit and scope of the present invention and it is intended that such obvious changes and modifications be embraced by the annexed claims.

What is claimed is:

1. In a bicycle hub including a rotatable casing and drive means, gear means within said casing and operatively connected with said drive means, a friction socket disposed within said casing and slidingly engaging said casing, said friction socket being provided with recesses, and pawl means operatively connected with said gear means within said casing and extending through said recesses of said friction socket to engage said casing, whereby upon actuating said drive means rotation is transmitted to said casing through said gear means and said pawl means.

2. A hub as defined in claim 1, wherein said pawl means is pivotally mounted so as to be capable of being pivoted out of engagement with said casing, said friction socket being frictionally carried along during free wheeling so as to displace said recesses relative to said pawl means whereby said pawl means is pivoted out of engagement with said casing, said casing thus continuing to rotate without positive connection with said pawl means.

3. A hub as defined in claim 2, wherein said friction socket includes an outwardly arched leaf spring portion abutting against an annular portion of said casing and inwardly directed projections spaced from said recesses, whereby during free wheeling abutment of said leaf spring portion with said annular portion causes said friction socket to be displaced for pivoting of said pawl means, said projections then engaging said pawl means and preventing further displacement of said friction socket.

4. A hub as defined in claim 3, wherein said friction socket is a tubular member with said leaf spring portion, said projections and said recesses being formed by stamping.

5. A bicycle hub comprising a rotatable casing provided with an annular inner surface having cam projections, driving means including an impeller extending into said casing, a friction socket provided with a plurality of recesses, inwardly directed projections and outwardly arched leaf springs, said socket slidingly engaging the interior of said casing with said leaf springs frictionally resting on an annular surface of said casing, a gear within said casing and rotated by said impeller, a plurality of pins operatively connected with said gear and rotated thereby, a plurality of pawls each pivotally mounted on a respective pin, and spring means urging each pawl through a respective recess of said socket to engage a cam projection of said casing, whereby said casing is normally positively driven by said impeller whereas upon discontinuing actuation of said impeller said pawls cease to drive said cam projections and said socket is rotated with said casing due to friction between said leaf springs and said annular casing surface, said recesses thereby being displaced so as to pivot said pawls out of engagement with said cam projections so that said casing continues to rotate while said pawls are stationary.

No references cited.